United States Patent [19]
Lee

[11] Patent Number: 5,364,599
[45] Date of Patent: Nov. 15, 1994

[54] METHOD AND MULTI-EJECTOR TYPE OF SYSTEM FOR PURIFYING THE POLLUTED POISONOUS EXHAUST GAS

[75] Inventor: Bup-Jong Lee, Seoul, Rep. of Korea

[73] Assignee: Anico Co. Ltd., Seoul, Rep. of Korea

[21] Appl. No.: 31,418

[22] Filed: Mar. 15, 1993

[30] Foreign Application Priority Data

Jun. 27, 1992 [KR] Rep. of Korea ............ 92-11385

[51] Int. Cl.$^5$ ............ B01D 50/00; F01N 3/10; B65G 11/06
[52] U.S. Cl. .................... 422/170; 422/171; 422/173; 55/220; 55/222; 261/116; 261/DIG. 54
[58] Field of Search ............ 422/170, 171, 173, 200, 422/188, 189; 55/220, 222; 261/116, DIG. 54

[56] References Cited

U.S. PATENT DOCUMENTS

| | | | |
|---|---|---|---|
| 1,931,817 | 10/1933 | Hogan et al. | 422/170 |
| 3,248,177 | 4/1966 | Grolee | 422/170 |
| 3,386,798 | 6/1968 | Beavans et al. | 422/170 X |
| 4,160,009 | 7/1979 | Hamabe | 422/108 |
| 4,200,442 | 4/1980 | Willot | 55/222 |
| 4,251,236 | 2/1981 | Fattinger et al. | 55/222 |
| 4,505,719 | 3/1985 | Goeke et al. | 55/222 X |
| 4,507,274 | 3/1985 | Broecker et al. | 422/200 X |
| 4,708,721 | 11/1987 | Ehuler | 55/40 |
| 4,723,968 | 2/1988 | Schippert et al. | 55/80 |
| 4,999,167 | 3/1991 | Skelley et al. | 422/175 |

Primary Examiner—Robert J. Warden
Assistant Examiner—Christopher Y. Kim
Attorney, Agent, or Firm—Shlesinger, Arkwright & Garvey

[57] ABSTRACT

A method and A multi-ejector type of system for efficiently purifying the polluted poisonous exhaust gas, which is inevitably generated from the progress of work of the manufactories of various kinds. This multi-ejector type of system comprises a pre-processing part and a post-processing part. The former part preliminarily removes dust from the exhaust gas and causes the temperature of the exhaust gas to be reduced to a predetermined degree, while the latter part neutralizes and washes the exhaust gas, which has been processed in the former part, so as to cause the pollutants to be completely removed from the exhaust gas. Here, the former part is connected to the latter part through a plurality of pipe lines. This multi-ejector type of system has a such simple construction that it is run on a small scale and is inexpensive and this makes the system be easily equipped without expensive burdensome. In addition, this system permits the pollutants to be completely removed from the polluted poisonous exhaust gas so as to improve the purification efficiency.

15 Claims, 6 Drawing Sheets

METHOD AND MULTI-EJECTOR TYPE OF SYSTEM FOR PURIFYING THE POLLUTED POISONOUS EXHAUST GAS

BACKGROUND OF THE INVENTION

1. Field of the Invention

The present invention relates in general to purification of polluted poisonous exhaust gas, and more particularly to a method and a multi-ejector type of system for efficiently purifying such a polluted poisonous exhaust gas, which is inevitably generated from factories of various kinds.

2. Description of the Prior Art

It is noted that in the manufacture of various goods, such as manufacturing the leather goods, the iron and steel goods, the food, the wall paper, the plastic goods and the like, polluted poisonous exhaust gas containing pollutants, such as DOP (dioctyl phthalate) droplets, oil cinders, smoke, odor and etc., are exhausted and which causes serious environmental pollution, particularly air pollution. In order to solve this problem, several types of known methods and systems for purifying the polluted poisonous exhaust gas have been proposed.

For example, there has been proposed an exhaust gas purifying system which comprises a plurality of large and small reservoirs sequentially arranged such that they communicate with each other through a plurality of pipe lines. In this known system, the polluted poisonous exhaust gas emitted from the progress of work is permitted to sequentially pass through the reservoirs, into which predetermined chemicals, such as neutralizing agents, are added at the same time so as to neutralize the exhaust gas. On the other hand, there has been proposed another type of exhaust gas purifying system which additionally comprises a large-sized dust collection equipment, such as a cyclone dust collector, besides the aforementioned construction comprising the plurality of large and small reservoirs of the above exhaust gas cleaning system. In this latter system, the exhaust gas first passes through the dust collection equipment prior to its entrance into the reservoirs so that a portion of the pollutants in dust form is first removed from the exhaust gas. Thereafter, the remaining exhaust gas is permitted to sequentially pass through the reservoirs wherein predetermined chemicals are added to the exhaust gas so as to cause the exhaust gas to be neutralized.

However, these types of known exhaust gas purifying systems not only require the addition of chemicals as a neutralizer, to the exhaust gas passing through the reservoirs, but also consume a plurality of fabric filters. As a result, these known systems have a disadvantage in that they inevitably cause the user to pay an enormous operational expense due to the consumption of the high expensive chemicals and fabric filters. Furthermore, since the added chemicals must be purified in the final process of the exhaust gas purifying operation, another disadvantage of the known systems resides in that an additional expense is required and its purification processes are complex. In addition to the aforementioned disadvantages, these known systems have a further disadvantage in that they can not provide a desired purification efficiency. On the other hand, each of these known exhaust gas purifying systems is run on a very extensive scale so that it has still a further disadvantage in that it introduces not only the difficulty of securing the installing place therefor, but also a huge equipment expense to the user. Finally, the known systems require extensive maintenance due to their complicated construction.

SUMMARY OF THE INVENTION

It is, therefore, an object of the present invention to provide a method and a multi-ejector type of system for purifying a polluted poisonous exhaust gas in which the aforementioned disadvantages can be overcome and which accomplishes a simple process of exhaust gas purification. Simple in construction, thereby reducing the installing area needed, the equipment expense and the operational expense.

It is another object of the present invention to provide a method and a multi-ejector type of system for purifying a polluted poisonous exhaust gas in which the polluted poisonous exhaust gas is completely purified because all of the pollutants can be removed therefrom and, in this regard, an improved efficiency of the exhaust gas purification is accomplished.

In accordance with an embodiment, the present invention provides a multi-ejector type of system for purifying polluted poisonous exhaust gas comprising: pre-processing part for preliminarily removing pollutants from the exhaust gas and for causing the exhaust gas to be heat-exchanged with the cooling water so as to permit the exhaust gas temperature to be reduced to a predetermined degree and a post-processing part for neutralizing and washing the exhaust gas processed in the pre-processing part, so as to cause the remaining pollutants to be completely removed from the exhaust gas, the post-processing part being connected to the pre-processing part by a plurality of pipe lines.

BRIEF DESCRIPTION OF THE DRAWINGS

The above and other objects, features and other advantages of the present invention will be more clearly understood from the following detailed description taken in conjunction with the accompanying drawings, in which:

FIGS. 1A and 1B are continued schematic views showing a construction and exhaust gas purifying operation of an embodiment of a multi-ejector type of exhaust gas purifying system in accordance with the present invention, in which:

FIG. 1A shows a pre-processing part wherein dust is preliminarily removed from the exhaust gas and the exhaust gas temperature is reduced to a predetermined degree; and FIG. 1B shows a post-processing part wherein the exhaust gas is repeatedly neutralized and washed so as to make the pollutants be completely removed therefrom;

FIGS. 9A to 9C show the inner structure of a gas washing part of the post-processing part of FIGS. 1B, in which:

FIG. 9A is an elevational sectional view of the gas washing part;

FIG. 9B is a plan view of a circular partition; and

FIG. 9C is a plan view of a semicircular partition.

DETAILED DESCRIPTION OF THE PREFERRED EMBODIMENTS

Figure 1:
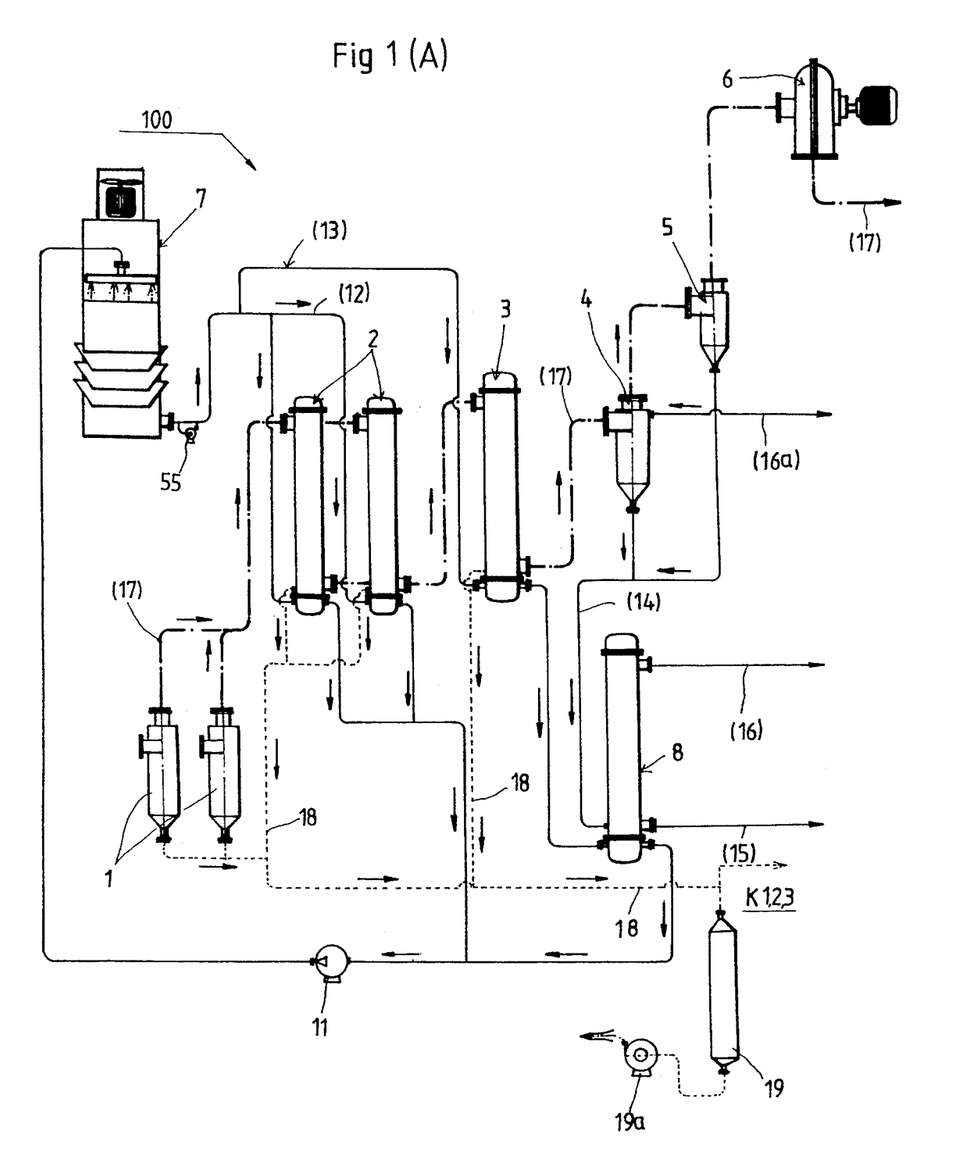
Figure 1B:
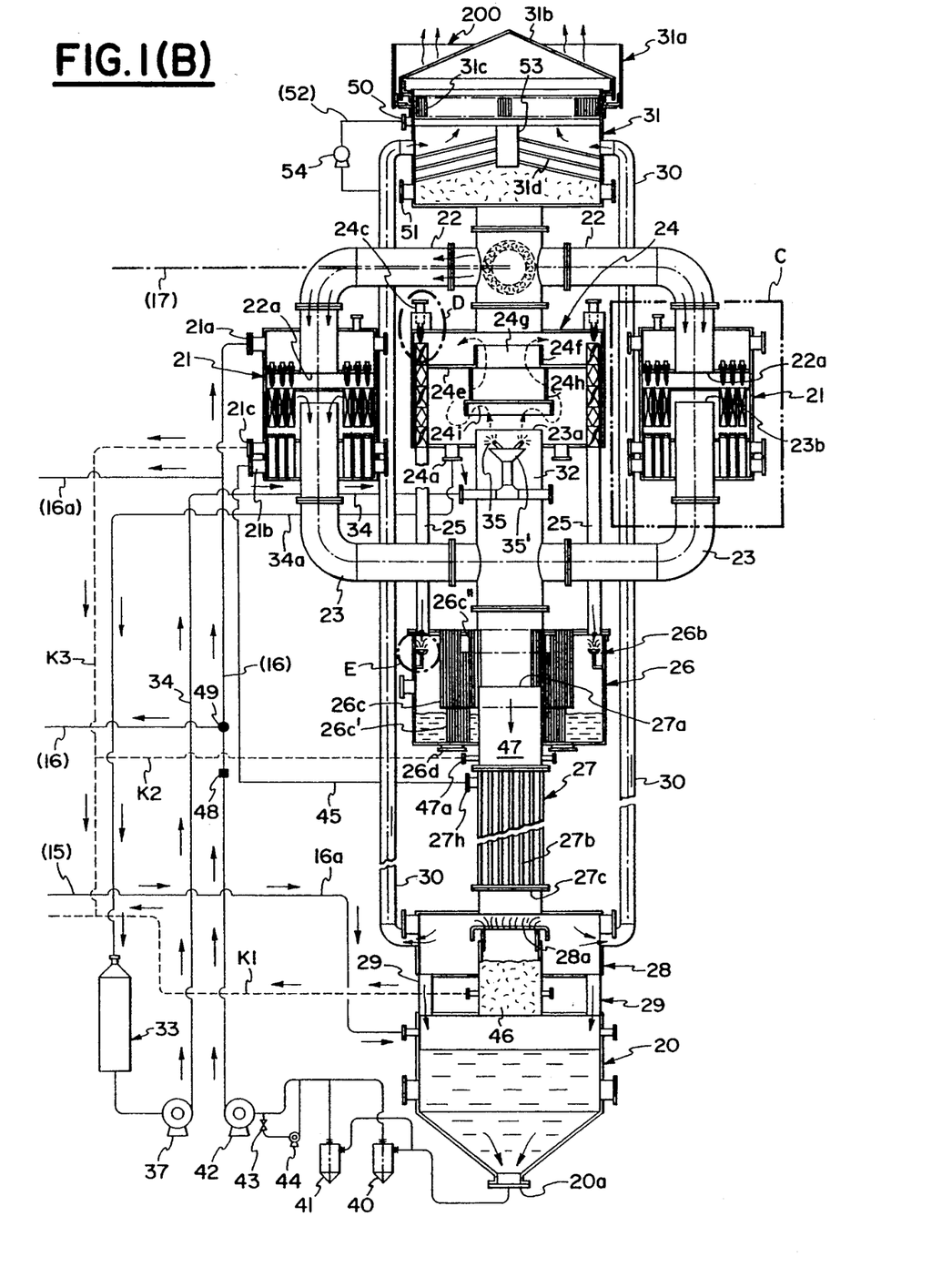

With reference to FIGS. 1A and 1B showing a construction and exhaust gas purifying operation of an embodiment of a multi-ejector type of exhaust gas purifying system in accordance with the present invention, this purifying system is divided broadly into two parts, that is, a pre-processing part 100 of FIG. 1A and a post-processing part 200 of FIG. 1B. The part 100 is adapted not only to cause a part of the pollutants in the form of dust to be removed from the exhaust gas but also to cause the exhaust gas temperature to decrease to a predetermined degree, while the part 200 is adapted to neutralize the remaining exhaust gas emitted from the part 100 and to cause the remaining pollutants to be completely removed from the exhaust gas before the exhaust gas is exhausted to the atmosphere.

As depicted in FIG. 1A, the pre-processing part 100 includes at least one, preferably two, cyclone dust collector 1 wherein the floating dust and the oil cinders in the exhaust gas are preliminarily removed from the exhaust gas by virtue of the cyclone effect. This cyclone dust collector 1 is in turn connected at its exhaust gas output port to a two-pass type of heat exchanging part, comprising three water-cooled indirect type of heat exchangers 2 and 3 wherein the polluted poisonous exhaust gas of high temperature is heat-exchanged with the cooling water and, in this regard, its temperature falls to a predetermined degree as it sequentially passes through the heat exchangers 2 and 3. Here, the first and second heat exchangers 2 are directly connected to the gas output port of the cyclone dust collector 1, respectively, while the third heat exchanger 3 is connected to the output ports of the first and second heat exchangers 2. This third heat exchanger 3 is provided with a gas output port which in turn is connected to a direct type of heat exchange cooler 4, which provides a water jet with a predetermined pressure for the exhaust gas so as to cause the temperature of the exhaust gas to rapidly fall simultaneously with extracting a predetermined amount of pollutants from the exhaust gas as the pollutants dissolve in the water jet. In addition, the pre-processing part 100 is provided with a gas/water separator 5 to which the output port of the heat exchange cooler 4 is also connected. Upon receiving the exhaust gas containing the pollutants, which is outputted from the heat exchange cooler 4, this gas/water separator 5 separates the moisture from the exhaust gas containing the pollutants. The gas/water separator 5 is also connected at its output port to a suction blower 6, which provides a suction power for all of the aforementioned members 1, 2, 3, 4 and 5. Additionally, a cooling tower 7 is connected to all of the three water cooled indirect type of heat exchangers 2 and 3 so as to supply the cooling water for the three members 2 and 3. The pre-processing part 100 is also provided with an auxiliary cooler 8 of which its two input ports are respectively connected to the third heat exchanger 3, the heat exchange cooler 4 and the gas/water separator 5 in such a manner that the one port is connected to the exchanger 3 and the other port is connected to both the cooler 4 and the separator 5. This auxiliary cooler 8 has three functions, that is, the first function for collecting the drained cooling water outputted from the third heat exchanger 3, the heat exchange cooler 4 and the gas/water separator 5 so as to permit the collected cooling water to return to the cooling tower 7, the second function for supplying the cooling water for a water collection reservoir 20 of the post-processing part 200, as will be described below, and the third function for auxiliarily cooling the cooling water which has returned from the water collection reservoir 20.

In the pre-processing part 100, the cooling water of the cooling tower 7 is circulated through a closed cooling water circulation pipe line system. This pipe line system comprises six water circulation pipe lines 12 to 16 and 16a. The first pipe line 12 connects the cooling tower 7, the first and second heat exchangers 2 and a motor pump 11. Through pipe line 12, the cooling water of the cooling tower 7 is permitted to be supplied to the heat exchanger 2, in order to exchange the heat with the high temperature exhaust gas, and in turn returns to the cooling tower 7 using the power generated by the motor pump 11. The second pipe line 13 connects the cooling tower 7, the third heat exchanger 3 and the auxiliary cooler 8 and permits the cooling water of the cooling tower 7 to sequentially pass through the third heat exchanger 3 and the auxiliary cooler 8, and thereafter, to return to the cooling tower 7. The third pipe line 14 connects both the heat exchange cooler 4 and the gas/water separator 5 to the auxiliary cooler 8, while the fourth pipe line 15 connects the auxiliary cooler to the water collection reservoir 20. On the other hand, the fifth pipe line 16 connects the water collection reservoir 20 to both the first neutralizing reservoir 21 of the post-processing part 200 and the auxiliary cooler 8, while the sixth pipe line 16a connects the fifth pipe line 16 between the water collection reservoir 20 and the first neutralizing reservoir 21 to the heat exchange cooler 4, thereby permitting the cooler 4 to be supplied with the cooling water outputted from both the water collection reservoir 20 and the first neutralizing reservoir 21.

Additionally, in order to cause the poisonous gas containing the pollutants to sequentially pass through the cyclone dust collector 1, the heat exchangers 2 and 3, the heat exchange cooler 4, the gas/water separator 5 and the suction blower 6, there is provided a gas pipe line 17 which connects the members 1, 2, 3, 4, 5, and 6 to each other. From the suction blower 6, this gas pipe line 17 also extends to a gas distribution pipe 22 which is in turn connected to the first neutralizing reservoir 21 of the post-processing part 200. On the other hand, the pollutants extracted from the exhaust gas by the members 1, 2 and 3 of the pre-processing part 100 are drained to a pollutant collection reservoir 19 through a pollutant output pipe line 18, which is connected between the members 1, 2 and 3 and the reservoir 19, thereafter, the pollutants are discharged from the reservoir 19 to a pollutant treating device (not shown) by a motor pump 19a.

On the other hand, FIG. 1B shows the post-processing part 200. As depicted in this drawing, the post-processing part 200 includes a plurality of first neutralizing reservoirs 21 each having a predetermined scale. These first neutralizing reservoirs 21 are circumferentially arranged as surrounding a second neutralizing reservoir 24 and these reservoirs 21 are spaced apart from each other by a predetermined circumferential interval. The first neutralizing reservoirs 21 are respectively connected to the gas pipe line 17 of the pre-processing part 100 by way of the plurality of gas distributing pipes 22 which are radially arranged so as to connect the gas pipe line 17 to the radially arranged reservoirs 21. In order to connect each reservoir 21 to each corresponding gas distributing pipe 22, a discharge port 22a of the gas distributing pipe 22 is inserted in the reservoir 21. The first and second neutralizing reservoirs 21 and 24 are connected to each other by means of a plurality of gas outlet pipes 23. Below the second neutralizing reservoir 24, a first gas/water separating reservoir 26 is vertically disposed in such a manner that it is connected to the second neutralizing reservoir 24 through a plurality of connection pipes 25. At the inner middle portion of the first gas/water separating reservoir 26, an inlet port 27a of a gas washing part 27 is disposed such that its uppermost end is located at the middle portion of the reservoir 26 and, in this regard, the two members 26 and 27 are connected to each other. The gas washing part 27 is provided with a plurality of washing bars 27b which are vertically arranged in the washing part 27 and each has a predetermined length and a relatively small diameter. This gas washing part 27 is also connected to a second gas/water separating reservoir 28 by means of its lower output port 27c. Below the second gas/water separating reservoir 28, the water collection reservoir 20 is disposed as connected to the reservoir 28 by means of a plurality of connection pipes 29. In addition, this post-processing part 200 is provided with a third neutralizing reservoir 31 which is vertically disposed above the second neutralizing reservoir 24 as connected to the reservoir 24 by means of a plurality of connection pipes 30. At this third neutralizing reservoir 31, the final process of the exhaust gas purifying operation is carried out.

On the other hand, the radially disposed gas outlet pipes 23 for connecting the first and second neutralizing reservoirs 21 and 24 to each other are concentrated on a gas outlet port 23a which is vertically connected to the lower part of the second neutralizing reservoir 24 and provides a gas ascending passage 32 for the second reservoir 24. At a predetermined position inside the outlet port 23a, chemical ejection nozzles 35 are disposed as supported by a nozzle support member 35'. In order to supply the chemicals, such as a neutralizer, for this chemical ejection nozzles 35, there is additionally provided a chemical reservoir 33 which is connected to the nozzles 35 by means of a chemical feed pipe line 34. Also, in order to recover the used chemicals from the second neutralizing reservoir 24, a chemical recovering pipe line 34a is provided as connected between a chemical output port 24a, which is disposed at the lower part of the second neutralizing reservoir 24, and the chemical reservoir 33. In addition, a motor pump 37 is provided on the chemical feed pipe line 34 so as to make the chemicals be circulated and, in this regard, to cause the chemical ejection and recovering operation to be repeatedly performed.

In the fifth pipe line 16 which is connected between an output port 20a of the water collection reservoir 20 and cooling water inlet ports 21a of the first neutralizing reservoirs 21, a pair of filters 40 and 41 and a motor pump 42 are sequentially arranged. Owing to such an arrangement, the cooling water is repeatedly circulated simultaneously with being filtered off the pollutants therefrom as it passes through the filters 40 and 41. In addition, a check valve 43 and a small capacity motor pump 44 are sequentially connected between the filter 41 and the motor pump 42. These members 43 and 44 are adapted to prevent this exhaust gas purifying system from malfunctioning or becoming dysfunctional due to a low temperature in winter. In other words, if this system is necessarily continuously stops its operation in winter, it may be broken as its cooling water freezes due to the low temperature. However in this system, the check valve 43 and the small capacity motor pump 44 can be driven so as to cause the cooling water to be continuously circulated irrespective of the continued operational stop of this system and, in this regard, the cooling water is efficiently prevented from freezing due to the low temperature and this prevents the system from being broken.

In addition, a cooling water circulation pipe line 45 is connected between a cooling water output port 21b of each first neutralizing reservoir 21 and a cooling water input port 27h of the gas washing part 27. Thus, the cooling water is permitted to be supplied from the first neutralizing reservoir 21 to the gas washing part 27.

On the other hand, this post-processing part 200 is provided with two pollutant extracting chambers 46 and 47, the former 46 being disposed between the second gas/water separating reservoir 28 and the water collection reservoir 20 while the latter 47 being disposed between the gas washing part 27 and the first gas/water separating reservoir 26. In addition, each first neutralizing reservoir 21 is provided at it lower part with a pollutant output port 21c. The two pollutant extracting chambers 46 and 47 and the pollutant output port 21c of the first neutralizing reservoir 21 are respectively connected to the pollutant collection reservoir 19, shown in FIG. 1A, by way of the pollutant discharging pipe lines K1, K2 and K3, thereby permitting the pollutants extracted in the respective processes carried out by the post-processing part 200 to be discharged to the pollutant collection reservoir 19 through the pollutant pipe lines K1, K2 and K3.

As depicted in FIG. 1B, the fifth pipe line 16, connecting the first neutralizing reservoirs 21 to the water collection reservoir 20, is also provided with a temperature sensor 48 and a solenoid valve 49. These members 48 and 49 are disposed at a branching portion of the pipe line 16, at which branching portion the pipe line 16 is also connected to the auxiliary cooler 8, and are adapted to control, in cooperation with each other, the flow passage of the cooling water, circulated between the first neutralizing reservoirs 21 and the water collection reservoir 20, in accordance with the cooling water temperature. In other words, the sensor 48 senses the temperature of the cooling water, which is repeatedly circulated between the water collection reservoir 20 and the first neutralizing reservoirs 21 through the fifth pipe line 16, so as to determine whether the temperature of the cooling water is higher than a predetermined reference temperature, for example, about 20° C. If the sensed temperature is higher than the reference temperature, the sensor 48 causes the solenoid valve 49 to start its operation for permitting the cooling water to be introduced to the auxiliary cooler 8 instead of the first neutralizing reservoirs 21.

On the other hand, the third neutralizing reservoir 31 is provided at its upper part with a chemical inlet port 50 and at its lower part with a chemical output port 51. The two ports 50 and 51 are connected to each other by way of a chemical circulation pipe line 52 which is also equipped with a motor pump 54. At an inner center of the third neutralizing reservoir 31, a chemical ejection nozzle 53 is vertically downwardly arranged as connected to the chemical inlet port 50. Thus, the chemicals such as the neutralizer are repeatedly circulated through the chemical circulation pipe line 52, the motor pump 54, the inlet port 50, the ejection nozzle 53 and the output port 51.

Figure 2:
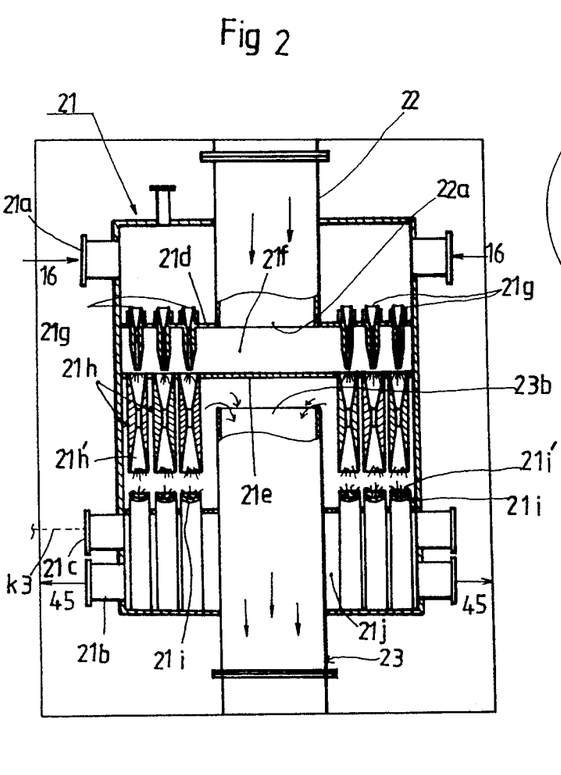
FIG. 2 is an enlarged view of a first neutralizing reservoir of the "C" section of FIG. 1B.

Of the post-processing part 200, each first neutralizing reservoir 21 primarily receives the pre-purified exhaust gas outputted from the pre-processing part 100 through the gas pipe line 17 and the gas distributing pipe 22. With reference to FIG. 2, which is an enlarged sectioned view of the first neutralizing reservoir 21, together with FIG. 1B, this reservoir 21 is provided with a pair of lateral partitions 21d and 21e between the discharge port 22a of the gas distributing pipe 22 and an inlet port 23b of the gas outlet pipe 23. The partitions 21d and 21e are disposed so as to be vertically spaced from each other by a predetermined interval, thereby providing a gas inlet chamber 21f therebetween. Here, the upper partition 21d is provided with a plurality of cooling water ejection nozzles 21g which are vertically disposed such that they penetrate the upper partition 21d until their lower ends nearly reach the lower part of the gas inlet chamber 21f. These cooling water ejection nozzles 21g permit the cooling water flowing in through the cooling water inlet port 21a to downwardly spout. Also, below the cooling water ejection nozzles 21g, a plurality of diffusers 21h are vertically arranged in such a manner that the upper end of each diffuser 21h is aligned with a corresponding ejection nozzle 21g. Each diffuser 21h has a vertical flow passage 21h' of which the inner diameter is gradually reduced until it reaches its middle part but gradually increased until it reaches its lower end. By virtue of such an intrinsic structure of the flow passage 21h' provided by the diffusers 21h, the water-soluble pollutants in the exhaust gas easily dissolves in the cooling water as the exhaust gas downwardly passes together with the cooling water through the flow passage of each diffuser 21h. On the other hand, a plurality of atomizing members 21i, each having a depressed hemispherical atomizing surface 21i' at its uppermost end, are vertically arranged below the lower ends of the diffusers 21h, respectively, thereby causing the cooling water, which is being continuously dropped from the diffusers 21h along with the exhaust gas, to be struck against the atomizing surfaces 21i' so as to fly in all directions and to fall down to the bottom of the first neutralizing reservoir 21. As a result, the water-soluble pollutants of the exhaust gas fall down to the bottom of the first neutralizing reservoir 21 in the state of dissolving in the cooling water and are in turn introduced to the pollutant collection reservoir 19 through the pollutant output port 21c and the pollutant discharging pipe line K3. Here, the pollutants dissolving in the cooling water in a water collection chamber 21j of the first neutralizing reservoir 21 have a relatively low specific gravity, conventionally not more than 0.9, so that the pollutants float in the upper surface of the cooling water. Therefore, the pollutant output port 21c is preferably disposed at the upper part of the water collection chamber 21j so as to cause the pollutants floating in the upper surface of the cooling water in the water collection chamber 21j to be naturally discharged therefrom.

On the other hand, the remaining exhaust gas, from which almost pollutants have been removed, is discharged from the inlet port 23b of the gas outlet pipe 23 so as to be in turn introduced to the second neutralizing reservoir 24 wherein the continued purifying process for the exhaust gas is performed.

Figure 3:
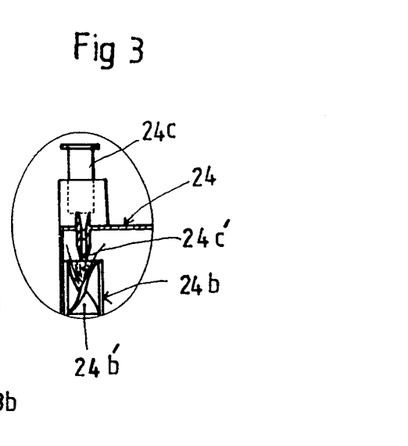
FIG. 3 is an enlarged view of a cooling water ejection nozzle and an ejector of the "D" section of FIG. 1B.

As shown in FIGS. 1B and 3, the second neutralizing reservoir 24, which is connected to the first neutralizing reservoirs 21 through the gas out let pipe 23 so as to be applied with the exhaust gas from the first neutralizing reservoirs 21 as above described, comprises a plurality of ejectors 24b which are circumferentially vertically laid across the cylindrical inner surface of the side wall of the second reservoir 24. These ejectors 24b are also vertically aligned at the lowermost ejector with the upper end of a corresponding connection pipe 25 through which the ejectors 24b communicate with the first gas/water separating reservoir 26. Each ejector 24b is also provided therein with a spiral-shaped flow passage 24b'. On the other hand, above the uppermost ejector 24b, a cooling water ejection nozzle 24c' is vertically disposed as mounted on the upper cover of the second reservoir 24 so as to be vertically aligned with the spiral-shaped flow passage 24b'. As a result, the exhaust gas, having been introduced into the second reservoir 24 through the outlet port 23a of the gas outlet pipe 23, is introduced into the spiral-shaped flow passage 24b' of the ejectors 24b along with the cooling water, the latter being ejected by the cooling water ejection nozzles 24c. Due to the spiral shape of the flow passage 24b', there occurs a vortex flow in the passage 24b' which makes the exhaust gas be sufficiently mixed with the cooling water. The mixture is then introduced into the first gas/water separating reservoir 26 through the connection pipes 25.

On the other hand, the second neutralizing reservoir 24 is also provided, at its upper part, with a lateral partition 24e of which the center is formed with a center cylinder 24f so as to provide a through hole 24g. In addition, above the outlet port 23a of the gas outlet pipe 23, a gas dispersing plate 24i is laterally arranged so as to be spaced apart from the outlet port 23a by a predetermined distance. In order to support the gas dispersing plate 24i at its position, there are provided a pair of support columns 24h each of which downwardly extends from the lateral partition 24e. As a result, the exhaust gas, which has been introduced into the second reservoir 24 through the outlet port 23a of the pipe 23, is mixed with the chemicals, such as the neutralizer, ejected from the chemical ejection nozzles 35, so as to be neutralized. This neutralized exhaust gas in turn ascends until it is struck against the under surface of the gas dispersing plate 24i. At this gas dispersing plate 24i, the exhaust gas turns its flowing direction to the downward direction and again ascends in order to be introduced into the through hole 24g of the center cylinder 24f. At the same time, the cooling water is downwardly ejected from the cooling water ejection nozzles 24c'. The exhaust gas containing the pollutants is introduced into the flow passage 24b' of the ejectors 24b and passes therethrough along with the cooling water which is ejected from the cooling water ejection nozzle 24c'. Thus, almost all of the pollutants remaining in the exhaust gas are neutralized as the exhaust gas passes through the flow passage 24b'. At this time, the neutralizer remaining in the second neutralizing reservoir 24 is discharged from the output port 24a of the reservoir 24 and passes through the chemical recovering pipe line 34a so as to be recovered by the chemical reservoir 33. Thereafter, the motor pump 37 causes the neutralizer, which has been recovered by the chemical reservoir 33, to be supplied to the chemical ejection nozzles 35. Here, the neutralizer is preferably selected from the acid, alkali and neutral chemicals, Moreover, the respective pressures in the first and second neutralizing reservoirs 21 and 24 can be controlled by the suction blower 6 such that each pressure is controlled to be "+" pressure more than the atmospheric pressure or "−" pressure not more than the atmospheric pressure.

Figure 4:
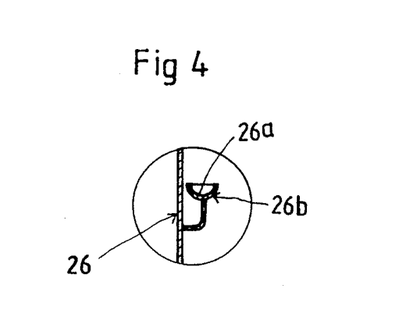
FIG. 4 is an enlarged view of an atomizing member of the "E" section of FIG. 1B.
Figure 5:
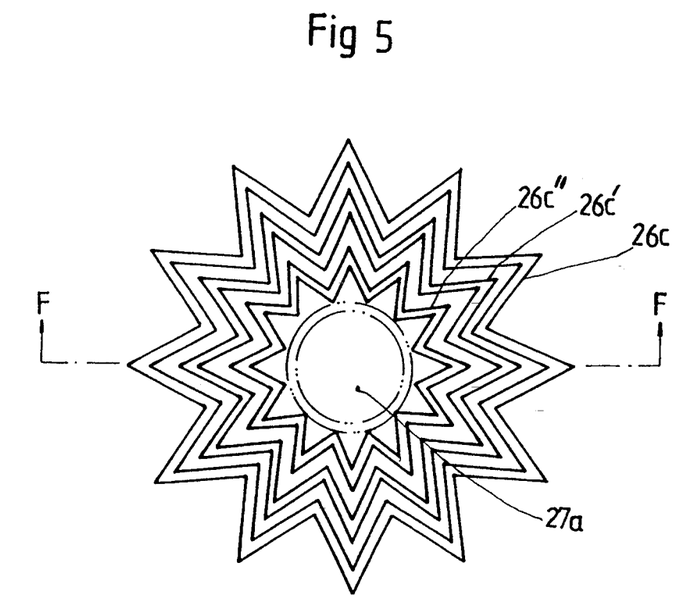
FIG. 5 is a plan view of three corrugated walls of a first gas/water separating reservoir of the post-processing part of FIG. 1B.
Figure 6:
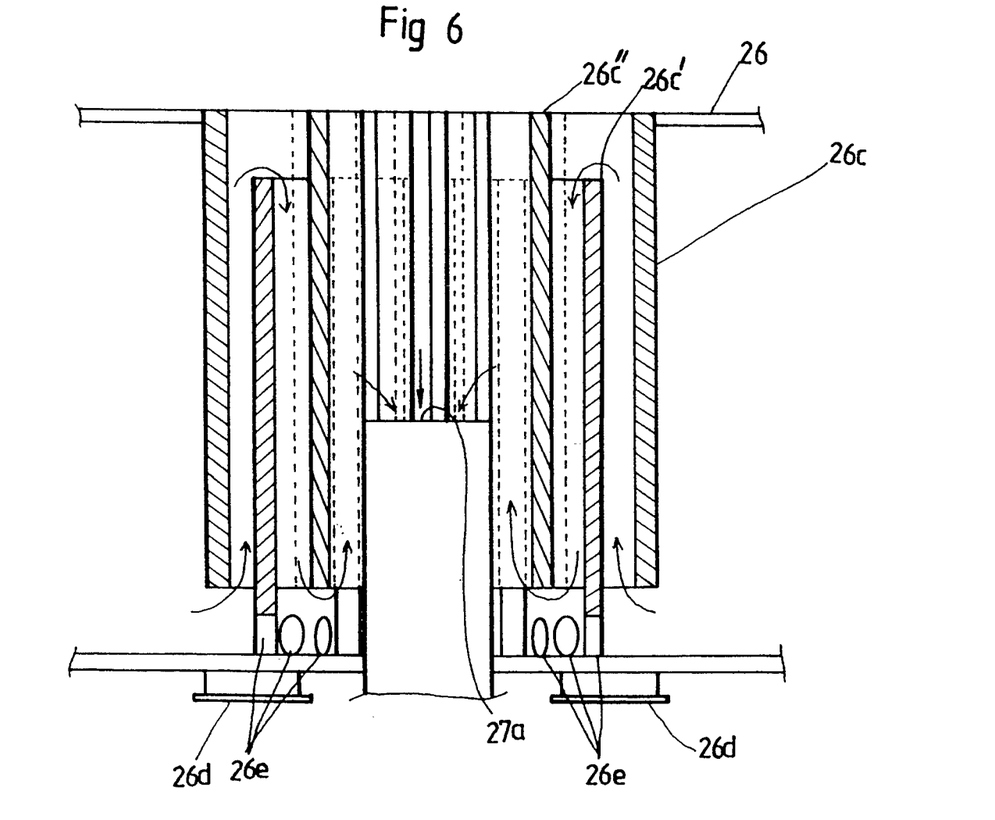
FIG. 6 is an elevational sectional view taken along the section line F—F of FIG. 5.

On the other hand, the first gas/water separating reservoir 26 is connected to the ejectors 24b of the second neutralizing reservoir 24 so as to receive the cooling water which has been mixed with the condensed exhaust gas when downwardly passing through the spiral-shaped flow passage 24b' of the ejectors 24b. This first gas/water separating reservoir 26 also permits the inlet port 27a of the gas washing part 27 to be inserted therein such that the uppermost end of the inlet port 27a is located at the middle portion of the reservoir 26. In addition, an atomizing member 26b, having a depressed hemispherical atomizing surface 26a at its uppermost end, is vertically arranged below the lowermost end of each connection pipe 25 as mounted on the side wall of the first gas/water separating reservoir 26 as depicted in detail in FIG. 4. Due to this construction, the cooling water, which continuously drops from the connection pipes 25 along with the exhaust gas, is struck against the atomizing surfaces 26a so as to fly in all directions and to fall down to the bottom of the reservoir 26. In addition, the first gas/water separating reservoir 26 is provided with three corrugated walls 26c, 26c' and 26c'' which have different sizes and are concentrically vertically arranged. As shown in FIGS. 5 and 6, these three corrugated walls 26c, 26c' and 26c'', preferably made of teflon, stainless steel or nylon, are vertically disposed such that they are radially spaced apart from each other by a predetermined interval and also the innermost wall 26c'' is spaced apart from the outer circumferential surface of the inlet port 27a of the gas washing part 27. Here, the middle wall 26c' upwardly extends from the bottom surface of the reservoir 26 while the outermost and innermost walls 26c and 26c'' downwardly extend from the upper surface of the reservoir 26. The free ends of the three walls 26c, 26c' and 26c'' provide, in cooperation with the upper and bottom surfaces of the reservoir 26, openings so as to permit the exhaust gas to pass therethrough. Due to this construction, the cooling water is struck against the atomizing surfaces 26a so as to fly in all directions in the shape of minute droplets and these minute droplets are then struck against the outer surface of the outermost wall 26c. Thus, almost all of the water-soluble pollutants remaining in the exhaust gas dissolve in the cooling water droplets on the outer surface of the outermost wall 26c and fall down to the bottom of the reservoir 26 along with the cooling water, while the remaining exhaust gas ascends along a first corrugated passage provided between the outermost and middle corrugated walls 26c and 26c'. As this exhaust gas reaches the upper part of the first corrugated passage, it passes through the opening provided between the upper surface of the reservoir 26 and the upper free end of the middle wall 26c' so as to in turn descend along a second corrugated passage provided between the middle and innermost corrugated walls 26c' and 26c''. Upon reaching the lower part the second corrugated passage, the exhaust gas passes through the opening provided between the bottom surface of the reservoir 26 and the lower free end of the innermost wall 26c'' so as to in turn ascend along the third passage provided between the innermost corrugated wall 26c'' and the outer surface of the inlet port 27a. Thereafter, the exhaust gas is introduced into the inlet port 27a so as to be applied to the gas washing part 27. During such a sequential ascending and descending of the exhaust gas along the first to third corrugated passages, the moisture remaining in the exhaust gas is dewed on the inner and outer surfaces of the three corrugated walls 26c, 26c' and 26c'' and, in this respect, the remaining moisture is efficiently removed from the exhaust gas. The dewed moisture then drops to the bottom of the reservoir 26. Here, in order to cause the cooling water collected on the bottom of the reservoir 26 inside of the middle wall 26c' to be drained to the outside of the middle wall 26c', there are provided at the lower part of the middle wall 26c'' a plurality of through holes 26e through which the inside and the outside of the middle wall 26c' to communicate with the each other. On the other hand, the cooling water containing the water-soluble pollutants is discharged from the discharge port 26d so as to permit the pollutants to be collected by the pollutant collection reservoir 19.

The exhaust gas, from which almost all of the pollutants have been removed, is then introduced into the gas washing part 27 through the gas inlet port 27a so as to be washed. As depicted in detail in FIGS. 9A to 9C, this gas washing part 27 comprises a plurality of small-diameter washing bars 27b which are vertically enclosed in a large-diameter outer pipe. Here, in order to provide a gas flow passage and to support the small-diameter washing bars 27b in the large-diameter outer pipe, the large-diameter outer pipe is provided at its upper and lower inner parts with upper and lower circular partitions 27f (shown in detail in FIG. 9B), respectively, each of which has an outer diameter which is slightly smaller than the inner diameter of the large-diameter outer pipe so as to provide an annular passage 27g between the outer periphery of the partition 27f and the inner surface of the large-diameter outer pipe. In addition, a pair of semicircular partitions 27d (shown in detail in FIG. 9C) are laterally oppositely mounted on the inner middle surface of the large-diameter outer pipe so as to provide a center passage 27e between the inner peripheries of the partitions 27d. These partitions 27d and 27f are also provided with a plurality of through holes for causing the small-diameter washing bars 27b to penetrate therethrough so as to be supported at their vertical positions. Owing to such a construction of the gas washing part 27, the exhaust gas, which has been introduced into the gas washing part 27, descends along a curved passage such that it first passes through the upper annular passage 27g, thereafter, turns its flowing direction to radially inward direction so as to pass through the center passage 27e and in turn radially outwardly turns its flowing direction so as to pass through the lower annular passage 27g. Here, the large-diameter outer pipe and the small-diameter washing bars 27b are preferably controlled in their lengths as required. On the other hand, the gas washing part 27 is also provided at its upper side wall with a cooling water inlet port 27h through which the cooling water flows in. Thus, the pollutants remaining in the exhaust gas, when this exhaust gas descends toward the outlet port 27c through the curved passage in the gas washing part 27, is moisturized by the cooling water and dewed on the outer surfaces of the washing bars 27b and this makes the gas purification efficiency be improved. In addition, this gas washing part 27 includes an upper outlet port 47a through which small amount of gaseous pollutants such as DOP are discharged so as to be collected by the pollutant collection reservoir 19.

The exhaust gas is then supplied together with the cooling water, from the gas washing part 27 to the second gas/water separating reservoir 28 and enters the third neutralizing reservoir 31 by way of the connection pipes 30. Here as shown in FIG. 1B, the second gas/water separating reservoir 28 has an atomizing plate 28a having a predetermined size. This atomizing plate 28a is laterally arranged vertically below the outlet port 27c of the gas washing part 27 so as to cause the cooling water containing the pollutants to be struck against the upper surface of the atomizing plate 28a so as to fly in all directions and to fall down. As a result, additional gas/water separating efficiency is obtained. On the other hand, the water collection reservoir 20, to which the cooling water downwardly flows from the second gas/water separating reservoir 28 through a plurality of connection pipes 29, is provided at its upper part with the upper pollutant extracting chamber 46. Thus, the gaseous pollutants, such as the DOP, in the water collection reservoir 20 ascends high up to the upper pollutant extracting chamber 46 and discharged to the pollutant collection reservoir 19 by way of the pollutant discharging pipe line K1.

The third neutralizing reservoir 31 comprises an outer casing 31a which encloses a conical-shaped water collection member 31b. Below the water collection member 31b, a pig hair filter 31c and the chemical ejection nozzle 53 are sequentially arranged. This third neutralizing reservoir 31 is also provided with a plurality of washing bars 31d each of which is downwardly inclined and extends from the side surface of the nozzle 53 toward the inner surface of the side wall of the reservoir 31. Thus, the exhaust gas, which has been introduced in the reservoir 31 through the connection pipes 30, is mixed with the neutralizer ejected from the nozzle 53 and the mixture upwardly passes by the washing bars 31d, thereby causing the remaining pollutants to be dewed on the washing bars 31d and in turn to drop to the bottom of the reservoir 31. At this time, the purified exhaust gas continuously ascends high up to the water collection member 31b through the pig hair filter 31c. As the gas reaches the water collection member 31b, it is struck against the under surface of the member 31b so as to turn its flowing direction downwardly and in turn exhausted to the atmosphere through the passage provided between the outer casing 31a and the water collection member 31b, thereby causing the remaining moisture and pollutants to be completely removed from the exhaust gas.

Figure 7:
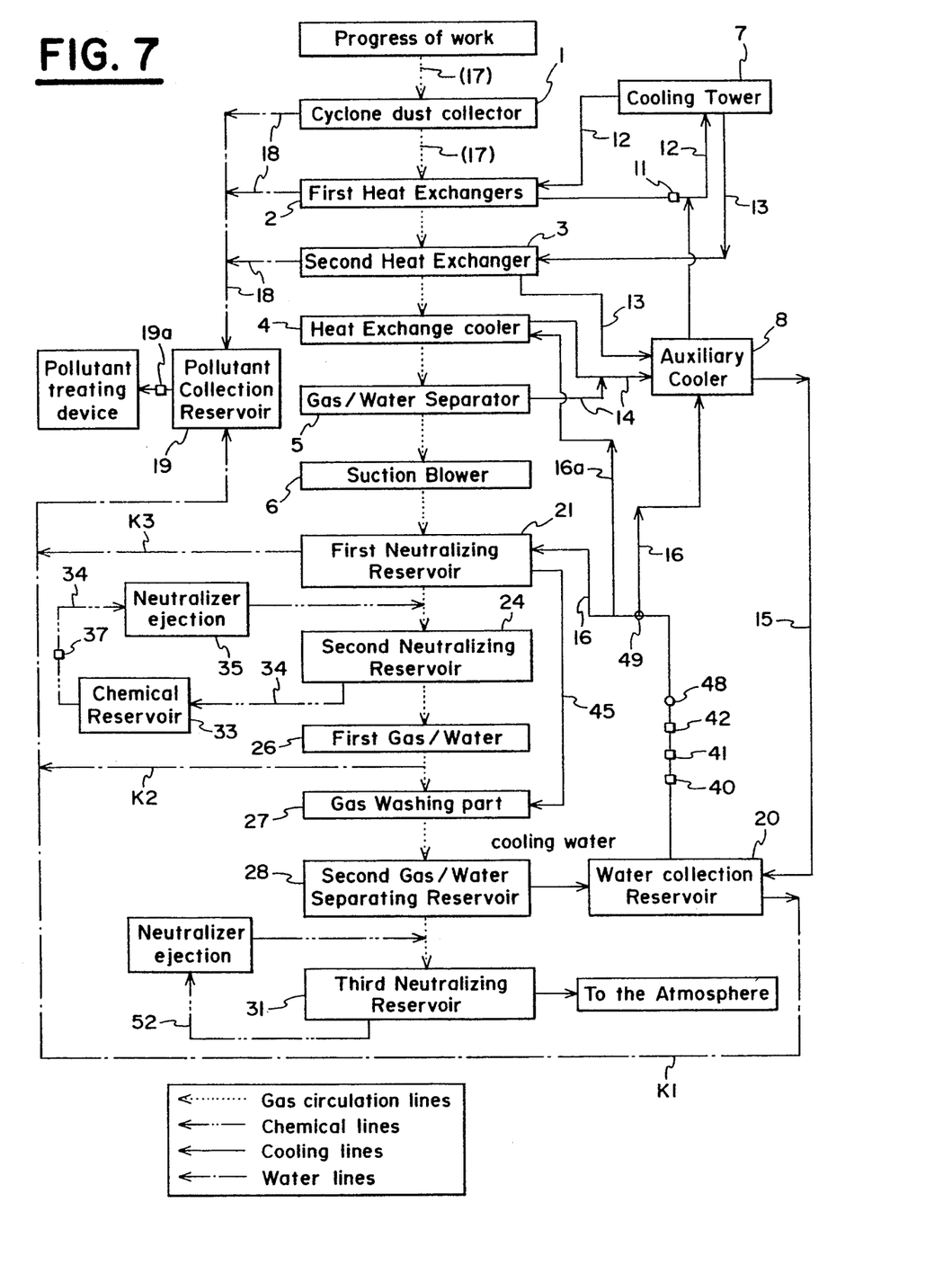
FIG. 7 is a block diagram showing the exhaust gas purifying processes carried out by the system in accordance with the present invention.

In FIG. 1A, the reference numeral 55 denotes a small capacity motor pump having the same function as that of the aforementioned motor pump 44 of FIG. 1B, Hereinafter, the exhaust gas purifying processes performed by the present purifying system having the aforementioned construction will be described in detail in conjunction with the block diagram of FIG. 7.

PROCESS 1

In this process, the polluted poisonous exhaust gas containing pollutants, which is inevitably generated during manufacture of various goods, such as for manufacturing the food, the leather goods, the plastic goods and etc., is permitted to pass through at least one cyclone dust collector 1 having the conventional construction, thereby preliminarily removing a portion of the pollutants, such as dust, and DOP from the exhaust gas.

As the exhaust gas is treated in this process, about 5% of pollutants in the exhaust gas is preliminarily removed from the gas owing to the cyclone effect provided by the cyclone dust collector 1. Here, the number of cyclone dust collector 1 may be selected in accordance with the amount of the exhaust gas which intends to be treated. The removed pollutants are drained to the pollutant collection reservoir 19 by way of the pollutant output pipe line 18 in order to be then discharged to the pollutant treating device.

PROCESS 2

In this process, the polluted poisonous exhaust gas, which has been treated in the process 1 so as to permit a predetermined amount of pollutants to be removed therefrom, is permitted to pass through the water-cooled indirect type of heat exchangers 2 and 3, each having the conventional construction, in order to cause the exhaust gas temperature, conventionally having the range of about 350° C.–600° C., to be lowered and a predetermined part of remaining pollutants to be removed from the exhaust gas.

Figures 8, 9:
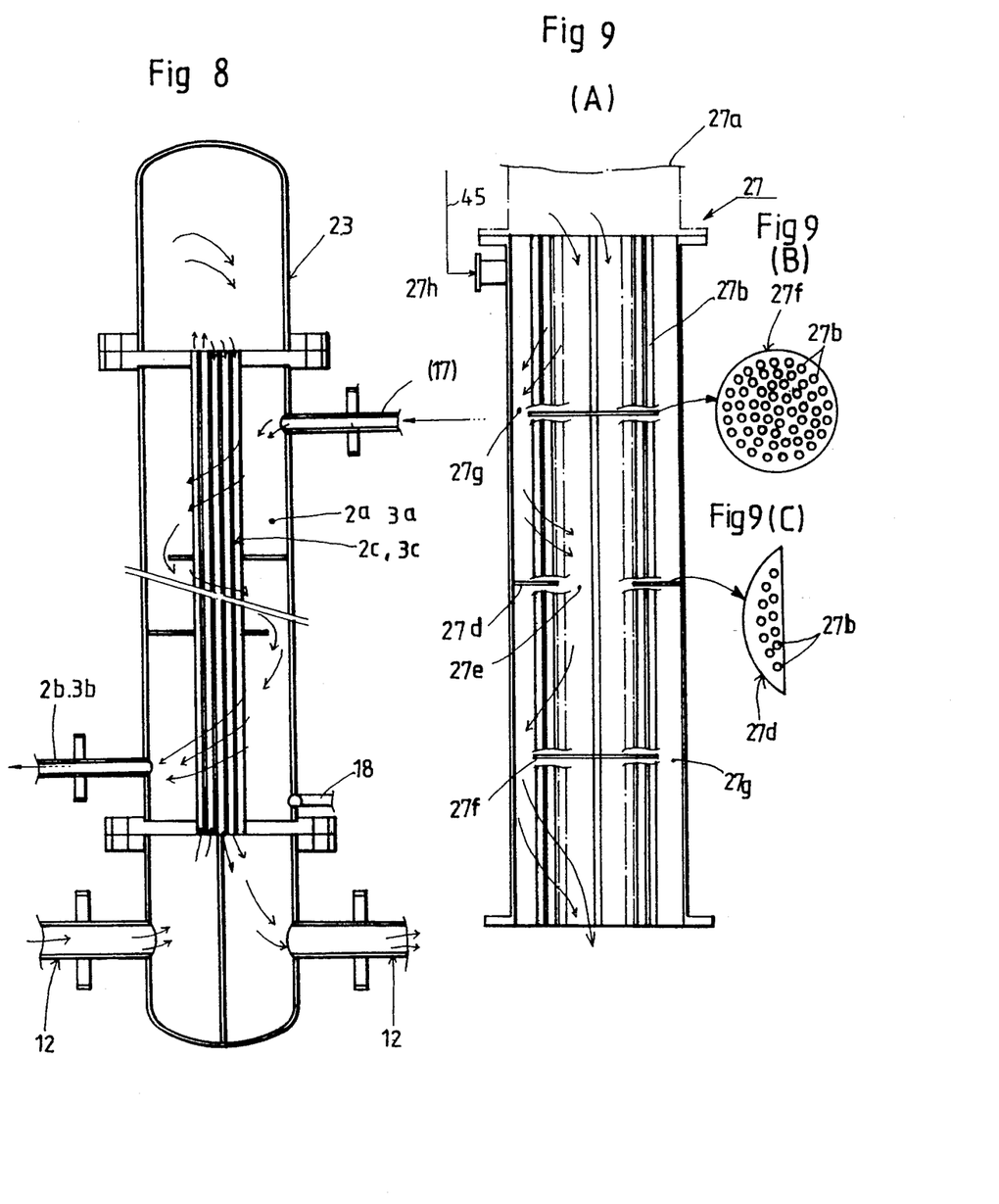
FIG. 8 is an elevational sectional view of a water-cooled indirect type of heat exchanger of the pre-processing part of FIG. 1A.

When the exhaust gas is applied from the cyclone dust collector 1 to the heat exchanger 2 or 3, the exhaust gas slowly descends, as shown in FIG. 8, from the upper part of a heat exchanging chamber 2a or 3a of each of the heat exchangers 2 and 3 to a lower outlet port 2b or 3b so as to be discharged therefrom. During such a downward flow of the exhaust gas, this exhaust gas comes in contact with the outer surfaces of heat exchanging pipes 2c or 3c, through which the cooling water is circulated, thereby causing the temperature of the exhaust gas to be rapidly lowered due to heat exchange with the heat exchanging pipes 2c or 3c of low temperature. At this time, there necessarily occurs condensation on the outer surfaces of the heat exchanging pipes 2c or 3c and this causes the pollutants, such as oil cinders, dust and DOP, to be absorbed by the condensed droplets so as to be removed from the exhaust gas. The pollutants removed from the exhaust gas due to the condensation are then drained to the pollutant collection reservoir 19 by way of the pollutant output pipe line 18 and in turn discharged to the pollutant treating device. Here, the water-cooled indirect type of heat exchangers 2 and 3, the number of them being selected as required, are connected to each other so as to permit the exhaust gas to sequentially pass through the connected heat exchangers 2 and 3.

PROCESS 3

In this process, the polluted poisonous exhaust gas, which has been treated in the process 2 so as to permit its temperature to be rapidly lowered simultaneously with removing the predetermined amount of pollutants therefrom, is permitted to pass through the direct type of heat exchange cooler 4 in order to cause its temperature to be rapidly lowered to a degree less than about 60° C. and to cause a predetermined part of water-soluble pollutants to dissolve in the cooling water, thereby permitting about 30% of pollutants to be removed therefrom.

In the direct type of heat exchange cooler 4, the cooling water is downwardly ejected from the upper part of the cooler 4 and the exhaust gas ascends so as to be discharged from the cooler 4 as contacting with the ejected cooling water. As a result, the temperature of the exhaust gas is rapidly lowered; moreover, a part of the water-soluble pollutants dissolves in the cooling water and, as a result, about 30% of pollutants are removed from the exhaust gas.

PROCESS 4

In this process, the polluted poisonous exhaust gas, which has been treated in the process 3 in order to cause its temperature to be rapidly lowered to a degree less than about 60° C. and to cause about 30% of pollutants to be removed therefrom, is permitted to pass through the gas/water separator 5 so as to cause the moisture to be removed therefrom, thereafter, the exhaust gas is introduced to the continued process through the gas pipe line 17.

In the aforementioned processes 1 to 4, the exhaust gas sequentially passes through the above-mentioned members 1, 2, 3, 4 and 5, which are connected to each other by the gas pipe line 17, by means of the suction power generated by the suction blower 6. Also, when the exhaust gas passes through the suction blower 6, this gas is then applied to the continued member, that is, the first neutralizing reservoir 21, by the blowing power of the blower 6 so as to be processed in the continued process, that is, the following process 5.

PROCESS 5

In this process, the pre-purified exhaust gas, which has been sequentially treated in the above Processes 1 to 4 in order to cause its temperature to be lowered to a degree less than about 60° C. and to cause at least 30% of pollutants to be removed therefrom, is permitted to pass through the first neutralizing reservoir 21. In this first neutralizing reservoir 21, the exhaust gas downwardly passes along with the cooling water, the latter being ejected from the cooling water ejection nozzles 21g, through the diffusers 21h, thereafter, the exhaust gas and the cooling water are struck against the atomizing members 21i. As a result, this exhaust gas is sufficiently mixed with the cooling water and flies in all directions and falls down to the bottom of the first neutralizing reservoir 21. Thus, almost all of the water-soluble pollutants of the exhaust gas fall down to the bottom of the first neutralizing reservoir 21 in the state of being dissolved in the cooling water. Thus, if the exhaust gas has been treated in this process, about 98% of pollutants are removed therefrom, On the other hand, the purified gas is introduced into the second neutralizing reservoir 24 through the gas outlet pipe 23.

The first neutralizing reservoir 21 is supplied with the cooling water through the fifth pipe line 16 and the inlet ports 21a disposed at the upper part of the reservoir 21. The cooling water, after passing through the above members 21g, 21h and 21i together with the exhaust gas, is then introduced into the gas washing part 27 through the cooling water circulation pipe line 45. On the other hand, the removed pollutants, dissolving and floating in the cooling water, are permitted to be drained to the pollutant collection reservoir 19 through the pollutant output port 21c and the pollutant discharging pipe line K3.

PROCESS 6

In this process, the exhaust gas, which has been treated in the above process 5 in order to cause a predetermined part of the pollutants to be removed therefrom and in turn introduced in the second neutralizing reservoir 24 through the gas outlet pipe 23, is permitted to pass upwardly through the second neutralizing reservoir 24. In this second neutralizing reservoir 24, the exhaust gas sequentially passes along with the cooling water, which is ejected from the cooling water ejection nozzles 21g, through the ejectors 24b so as to be efficiently mixed with the cooling water. Thereafter, the mixture drops to the first gas/water separating reservoir 26, wherein the continued process is performed, through the connection pipes 25. In addition, prior to passing through the ejectors 24b in the reservoir 24, the exhaust gas is mixed with neutralizer, which is ejected from the chemical ejection nozzles 35 disposed in the outlet port 23a of the gas outlet pipe 23. Thus, as this exhaust gas is treated by this process 6, at least 99% of pollutants can be removed therefrom.

In this process, the neutralizer is preferably selected from the acid, alkali and neutral Anico liquid or chemicals in accordance with the characteristics of the exhaust gas. In addition, the cooling water ejection pressure at the cooling water ejection nozzles 24c is preferably controlled to be less than 10 Kg/cm$^2$ and the processing time in this process is preferred to be set within 3 seconds.

On the other hand, in order to reuse the neutralizer remaining in the second neutralizing reservoir 24, this neutralizer is circulated such that it is discharged from the output port 24a of the reservoir 24 and passes through the chemical recovering pipe line 34a so as to be recovered by the chemical reservoir 33, thereafter, the recovered neutralizer is supplied to the chemical ejection nozzles 35 through the chemical feed pipe line 34. As a result, the consumption of neutralizer can be efficiently reduced to the minimum.

PROCESS 7

In this process, the cooling water, which drops from the ejectors 24b of the second neutralizing reservoir 24 through the connection pipes 25 as mixed with the exhaust gas, is permitted to be introduced into the first gas/water separating reservoir 26, thereby causing the purified exhaust gas to be separated from the cooling water and to be in turn introduced into the gas washing part 27 wherein the continued process is performed. In this first gas/water separating reservoir 26, the cooling water outputted from the connection pipes 25 is struck against the atomizing surfaces 26a of the atomizing members 26b each of which is disposed vertically below each connection pipe 25, so as to fly in all directions in the shape of minute droplets and to fall down to the bottom of the reservoir 26. As a result, the purified exhaust gas is separated from the exhaust gas.

The separated exhaust gas in the first gas/water separating reservoir 26 then sequentially passes through the three corrugated passages provided by the three corrugated walls 26c, 26c' and 26c", which have different sizes and are concentrically arranged, and the outer circumferential surface of the inlet port 27a of the gas washing part 27. This exhaust gas is, thereafter, introduced into the gas washing part 27 through the inlet port 27a. Here, as the exhaust gas passes through the inside of the first gas/water separating reservoir 26 as described above, almost all of the pollutants are removed therefrom as dissolved in the cooling water droplets, which fly in all directions when the cooling water is struck against the atomizing surfaces 26a of the atomizing members 26b and are struck against the outer surface of the outermost wall 26c so as to fall down to the bottom of the reservoir 26. Also, during the sequential ascending and descending of the exhaust gas along the three corrugated passages, the moisture remaining in the exhaust gas is dewed on the inner and outer surfaces of the three corrugated walls 26c, 26c' and 26c"

and, in this respect, the remaining moisture is efficiently removed from the exhaust gas.

PROCESS 8

In this process, the purified exhaust gas, which has been treated in the process 7, is permitted to pass downwardly through the inside of the gas washing part 27 in which the plurality of small-diameter gas washing bars 27b are vertically arranged. At the same time, this gas washing part 27 is supplied with the cooling water by way of the cooling water inlet port 27h, which is disposed at the upper part of the gas washing part 27. As a result, the pollutants remaining in the exhaust gas dissolve in the cooling water droplets, which are dewed on the outer surfaces of the gas washing bars 27b, and, in this regard, these pollutants are removed from the exhaust gas.

In this process, a part of gaseous pollutants, such as DOP, is discharged through the pollutant extracting chamber 47 provided at the upper part of the gas washing part 27 and collected by the pollutant collection reservoir 19. In addition, each small-diameter washing bar 27b may be preferably controlled in its length as required.

PROCESS 9

In this process, the cooling water along with the exhaust gas, both having been processed in the process 8, is permitted to introduced into the second gas/water separating reservoir 28 so as to be struck against the atomizing plate 28a and to fly in all directions. As a result, the exhaust gas is separated from the cooling water and is in turn upwardly introduced to the third neutralizing reservoir 31 by way of the connection pipes 30.

At this time, the cooling water, which has been struck against the atomizing plate 28a and flown in all directions so as to drop to the bottom of the second gas/water separating reservoir 28, is introduced into the water collection reservoir 20 through the plurality of connection pipes 29. This cooling water is circulated through the cooling water circulation pipe lines 16 and 16a so as to be reused. On the other hand, the gaseous pollutants, such as DOP, in the upper part of the cooling water in the water collection reservoir 20 floats in the upper part of the cooling water because of their relatively lower specific gravity than that of the water and drained to the pollutant collection reservoir 19 by way of the pollutant extracting chamber 46 and the pollutant discharging pipe line K1.

PROCESS 10

In the last process of the exhaust gas purification processes in accordance with this invention, the purified exhaust gas which has been processed in the process 9 is permitted to pass upwardly through the third neutralizing reservoir 31 so as to be completely purified and to be exhausted to the atmosphere. In this third neutralizing reservoir 31, the exhaust gas upwardly flowing in the reservoir 31 is mixed with the neutralizer, which is ejected from the chemical ejection nozzle 53, and passes by the washing bars 31d so as to cause all of the remaining pollutants to dissolve in the droplets dewed on the outer surfaces of the washing bars 31d and in turn to drop to the bottom of the reservoir 31 together with the droplets. Thereafter, the purified exhaust gas continuously ascends high up to the water collection member 31b through the pig hair filter 31c. As the gas reaches the water collection member 31b, it is struck against the under surface of the member 31b so as to turn its flowing direction downwardly and in turn exhausted to the atmosphere through the passage provided between the outer casing 31a and the water collection member 31b, thereby causing the remaining moisture to be completely removed from the exhaust gas.

In this process, the neutralizer is repeatedly circulated through the neutralizer circulation pipe line 52 so as to be reused, thereby causing the consumption of neutralizer to be efficiently reduced to the minimum.

As described above, the present invention provides a polluted poisonous exhaust gas purifying method and a multi-ejector type of system for performing such a method in which the polluted poisonous exhaust gas, which is inevitably generated from the progress of work of the manufactories of various kinds, is efficiently completely purified prior to its exhaust to the atmosphere, thereby preventing the exhaust gas from contaminating the environment. Particularly, this multi-ejector type of system has such a simple construction that it is run on a small scale and requires small equipment expense and, in this regard, the users, particularly small and medium enterprises, can be easily equipped with this system without heavy expenses. In addition, this system causes the operational trouble to scarcely occur owing to its simple construction and, in this respect, facilitates the maintenance thereof and substantially reduces the operational expense. Furthermore, this system permits the pollutants to be completely removed from the polluted poisonous exhaust gas so as to improve the purification efficiency. Moreover, the scale of this system, when it is installed, can be easily controlled in accordance with the amounts and characteristics of the exhaust gas which is to be treated.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A multi-ejector type of system for purifying polluted poisonous exhaust gas, comprising:
 a) first processing means for preliminarily removing pollutants from said exhaust gas and for causing the exhaust gas to be heat-exchanged with cooling water so as to permit the exhaust gas temperature to be reduced to a predetermined degree;
 b) second processing means for neutralizing and washing the exhaust gas processed in said first processing means, so as to cause the remaining pollutants to be completely removed from the exhaust gas, said second processing means being connected to said first processing means by a plurality of pipe lines;
 c) said first processing means comprising:
  i) at least one cyclone for preliminarily removing the floating dust from said polluted poisonous exhaust gas;
  ii) two-pass heat exchanging means for gradually lowering the temperature of the exhaust gas, said heat exchanging means comprising at least two water-cooled indirect heat exchangers each of which is supplied with said cooling water in order to cause heat exchange of the exhaust gas with the cooling water;
  iii) a direct heat exchange cooler for providing a cooling water jet of a predetermined pressure for rapidly lowering the temperature of the exhaust gas while extracting a predetermined portion of the pollutants from the exhaust gas;

iv) a gas-water separator for separating moisture from the exhaust gas containing the pollutants emitted from said heat exchange cooler;

v) a suction blower for exhausting the exhaust gas to sequentially pass through said members;

vi) a cooling tower for providing the cooling water;

vii) an auxiliary cooler for collecting cooling water from the two-pass heat exchanging means, the heat exchange cooler and the gas-water separator and returning to said cooling tower, said auxiliary cooler further supplying the cooling water to a water collection reservoir of said second processing means and auxiliarily cooling the cooling water outputted from said water collection reservoir;

viii) a gas pipe line for sequentially passing the exhaust gas through the cyclone, the two-pass heat exchanging means, the direct type of heat exchange cooler, the gas-water separator and the suction blower, said gas pipe line guiding the exhaust gas from the suction blower to a gas distributing pipe connected to a first neutralizing reservoir of said second processing means;

ix) a pollutant output pipe line for draining the pollutants extracted from the exhaust gas to a pollutant collection reservoir and discharging to a pollutant treating device; and x) a plurality of cooling water circulation pipe lines for circulating the cooling water through the cooling tower, said cooling water circulation pipe lines comprising:

a first pipe line for supplying the cooling water from the cooling tower to one of said water-cooled indirect heat exchangers and returning to the cooling tower;

a second pipe line for sequentially supplying the cooling water from the cooling tower to the other of said water-cooled indirect heat exchangers and said auxiliary cooler, and to return to the cooling tower;

a third pipe line for introducing the cooling water discharged from said heat exchange cooler and said gas-water separator to the auxiliary cooler;

a fourth pipe line for introducing the cooling water discharged from the auxiliary cooler to said water collection reservoir;

a fifth pipe line for introducing the cooling water discharged from the water collection reservoir to said first neutralizing reservoir of said second processing means and the auxiliary cooler; and a sixth pipe line for connecting said fifth pipe line between the water collection reservoir and the first neutralizing reservoir to the heat exchange cooler, thereby permitting the heat exchange cooler to be supplied with the cooling water discharged from the water collection reservoir and the first neutralizing reservoir;

d) said second processing means comprising:

i) a plurality of first neutralizing reservoirs for firstly neutralizing the exhaust gas emitted from said first processing means, each said first neutralizing reservoir being connected to said first processing means by a gas pipe line and a gas distributing pipe;

ii) a second neutralizing reservoir for secondly neutralizing the exhaust gas, said second neutralizing reservoir being disposed between the first neutralizing reservoirs and connected thereto by a plurality of gas outlet pipes;

iii) a first gas-water separating reservoir for firstly separating the exhaust gas from said cooling water, said first gas-water separating reservoir being vertically disposed below the second neutralizing reservoir and connected by a plurality of connection pipes;

iv) means for washing the exhaust gas using the cooling water, said gas washing means being disposed such that an inlet port thereof is disposed at the middle portion of the first gas-water separating reservoir and provided therein with a plurality of vertically arranged washing bars;

v) a water collection reservoir for collecting the cooling water processed in said second processing means, said water collection reservoir being connected to a second gas-water separating reservoir, said second gas-water separating reservoir being connected to said gas washing part by a lower output port;

vi) a third neutralizing reservoir for final purification of the exhaust gas, said third neutralizing reservoir being vertically disposed above the second neutralizing reservoir and connected by a plurality of connection pipes;

vii) first chemical ejection means for mixing the exhaust gas in said second neutralizing reservoir with neutralizer, said first chemical ejection means comprising:

at least one chemical ejection nozzle arranged in a gas outlet port of said gas outlet pipe connecting the first and second neutralizing reservoirs and providing a gas ascending passage for the second neutralizing reservoir;

a chemical feed pipe line for connecting a chemical reservoir to said chemical ejection nozzle;

a chemical recovering pipe line connecting a chemical output port of the second neutralizing reservoir to the chemical reservoir; and a pump means for generating power for the circulating the neutralizer.

viii) at least one cooling water filter and a cooling water circulation pump means for repeatedly circulating the cooling water simultaneously with filtering the pollutants therefrom, said filter and said pump means being sequentially arranged on a fifth pipe line connected between the water collection reservoir and the first neutralizing reservoirs;

ix) a check valve and pump means for circulating the cooling water when said system is nonoperational, thereby preventing system failure due to a low temperature, said check valve and pump means being arranged sequentially between said cooling water filter and said cooling water circulation pump mean;

x) a cooling water circulation pipe line for supplying the cooling water from the first neutralizing reservoirs to the gas washing part, said cooling water circulation pipe line being connected between cooling water output ports of the first neutralizing reservoirs and a cooling water input port of the gas washing means;

xi) pollutant draining means for draining the pollutants removed from the exhaust gas to a pollutant collection reservoir, said pollutant draining means comprising:
a plurality of pollutant extracting chambers for collecting and exhausting the pollutants, one of said pollutant extracting chambers is provided between the second gas-water separating reservoir and the water collection reservoir, and a second of said pollutant extracting chambers is provided between the gas washing means and the first gas-water separating reservoir;
a pollutant output port for draining the pollutants from each of the first neutralizing reservoirs; said pollutant output port being provided at the lower part of the first neutralizing reservoir; and
three pollutant discharging pipe lines for respectively connecting said two pollutant extracting chambers and said pollutant output port to the pollutant collection reservoir;

xii) a temperature sensor and a solenoid valve for controlling the flow of the cooling water, said cooling water being repeatedly circulated between the water collection reservoir and the first neutralizing reservoirs, such that the cooling water is permitted to be introduced to an auxiliary cooler of the first processing means when the cooling water temperature is higher than a predetermined temperature, the temperature sensor and the solenoid valve being sequentially arranged on a branching part of said fifth pipe line; and xiii) second chemical ejection means for mixing the exhaust gas in said third neutralizing reservoir with neutralizer, said second chemical ejection means comprising:
a chemical circulation pipe line for circulating the neutralizer therethrough, said chemical circulation pipe line being connected between a chemical inlet port and a chemical output port, said chemical inlet port and chemical output port being disposed at upper and lower parts of the third neutralizing reservoir, respectively;
a chemical ejection nozzle for ejecting the neutralizer therefrom, said chemical ejection nozzle being arranged at an inner center of the third neutralizing reservoir connected to the chemical inlet port; and
pump means for circulating the neutralizer.

2. A multi-ejector type of system for purifying polluted poisonous exhaust gas according to claim 1, wherein each said first neutralizing reservoir comprises:
upper and lower lateral partitions being laterally disposed in the first neutralizing reservoir between said discharge port of the gas distributing pipe and an inlet port of the gas outlet pipe, said lateral partitions providing a gas inlet chamber therebetween;
a plurality of cooling water ejection nozzles for permitting the cooling water to flow downwardly therefrom to the inside of said gas inlet chamber provided between the lateral partitions, said cooling water ejection nozzles vertically penetrating said upper lateral partition;
a plurality of diffusers for mixing the exhaust gas with the cooling water and for causing the water-soluble pollutants in the exhaust gas to substantially dissolve in the cooling water, each said diffuser being vertically aligned with a corresponding ejection nozzle and having a vertical flow passage having an inner diameter gradually reduced up to about the middle part thereof and gradually increased up to about the lower end thereof; and
a plurality of atomizing members for striking the cooling water dropping from said diffusers along with the exhaust gas so as to fly in substantially all directions and to fall down to the bottom of the first neutralizing reservoir and causing the pollutants to be removed from the exhaust gas by dissolving in the cooling water, said atomizing members each having a depressed hemispherical atomizing surface at its uppermost end and being vertically arranged below a lower end of the diffuser.

3. A multi-ejector type of system for purifying polluted poisonous exhaust gas according to claim 1, wherein said second neutralizing reservoir comprises:
a plurality of ejectors being circumferentially vertically laid across a cylindrical inner surface of the side wall of the second neutralizing reservoir so as to be vertically aligned with the upper end of the connection pipe through which said ejectors communicate with said first gas-water separating reservoir, each said ejector being provided therein with a spiral-shaped flow passage;
a cooling water ejection nozzle for ejecting the cooling water therefrom, said cooling water ejection nozzle being vertically mounted on an upper cover of the second neutralizing reservoir so as to be vertically aligned with said spiral-shaped flow passage, thereby causing the exhaust gas to be introduced into the spiral-shaped flow passage along with the cooling water ejected therefrom and causing the exhaust gas to be sufficiently mixed with the cooling water;
a lateral partition being laterally disposed at an inner upper part of the second neutralizing reservoir, said lateral partition being provided at its center with a center cylinder for providing a hole through which the exhaust gas upwardly passes; and
a gas dispersing plate for dispersing the exhaust gas, said gas dispersing plate being laterally supported by at least one support column;
whereby the exhaust gas, which has been neutralized as a result of mixing with the neutralizer ejected from said chemical ejection nozzle of the first chemical ejection means, is struck against the under surface of the gas dispersing plate and turns its flow direction downwards, thereafter, the neutralized exhaust gas again ascends through said hole of the center cylinder and is introduced into the spiral-shaped flow passage along with the cooling downwardly ejected water from the cooling water ejection nozzles.

4. A multi-ejector type of system for purifying polluted poisonous exhaust gas according to claim 1, wherein said first gas-water separating reservoir comprises:
a plurality of atomizing members for striking the cooling water dropping from said connection pipes at a predetermined pressure, so as to fly in substantially all directions, each said atomizing member having a depressed hemispherical atomizing surface at its uppermost end and being vertically arranged below the lowermost end of each corresponding connection pipe; and a plurality of corrugated walls being concentrically vertically arranged about the center of the first gas-water separating reservoir for striking the cooling water against the outer surface of the outermost corrugated wall so as to dissolve the pollutants in the cooling water and to fall down to the bottom of the first gas-water separating reservoir, said corrugated walls further causing the exhaust gas separated from the cooling water to sequentially pass through corrugated passages thereof and to be introduced into the inlet port of the gas washing means so as to be downwardly guided to said gas washing means.

5. A multi-ejector type of system for purifying polluted poisonous exhaust gas according to claim 4, wherein said corrugated walls comprises:

outermost, middle and innermost corrugated walls being vertically disposed so as to be radially spaced from each other by a predetermined interval, the innermost wall surrounding said inlet port of the gas washing means as spaced apart from the outer surface thereof, the middle wall upwardly extending from the bottom surface of the first gas-water separating reservoir, the outmost and innermost walls downwardly extending from the upper surface of said reservoir, said corrugated walls having free ends which define in cooperation with said upper and bottom surfaces of the reservoir, openings so as to permit the exhaust gas to pass therethrough, thereby providing said corrugated flow passage through which the exhaust gas ascends and descends until being introduced into said inlet port of the gas washing means and causing the moisture remaining in the exhaust gas to be dewed on the inner and outer surfaces of the three corrugated walls so as to be removed from the exhaust gas, said middle wall being provided at its lower part with a plurality of through holes for causing the inside and the outside of the middle wall to communicate with each other.

6. A multi-ejector type of system for purifying polluted poisonous exhaust gas according to claim 3, wherein said gas washing means comprises:

a pair of generally semicircular partitions being laterally oppositely mounted on an inner middle surface of a large-diameter outer pipe for providing a center passage between the inner peripheries of said semicircular partitions;

upper and lower circular partitions being laterally disposed at upper and lower inner parts of said large-diameter outer pipe, respectively, each said circular partition having an outer diameter smaller than an inner diameter of the large-diameter outer pipe so as to provide an annular passage between the outer periphery thereof and the inner surface of the large-diameter pipe, said annular passages constituting, in cooperation with said center passage provided by the semicircular partitions, a curved flow passage through which the exhaust gas passes; and a cooling water inlet port for downwardly ejecting the cooling water, said cooling water inlet port being disposed at an upper part of the large-diameter outer pipe.

7. A multi-ejector type of system for purifying polluted poisonous exhaust gas according to claim 3, wherein said second gas-water separating reservoir comprises:

an atomizing plate for striking the cooling water containing the pollutants against the upper surface of said plate so as to fly in substantially all directions and to fall down, said atomizing plate having a predetermined size and being laterally arranged vertically below an outlet port of said gas washing means.

8. A multi-ejector type of system for purifying polluted poisonous exhaust gas according to claim 3, wherein said third neutralizing reservoir comprises:

an outer casing;

a generally conical water collection member for collecting and removing the moisture from the exhaust gas, said water collection member being disposed in said outer casing;

a pig hair filter for filtering the exhaust gas prior to being in contact with said water collection member, said filter being arranged below the water collection member; and a plurality of washing bars for causing the pollutants to be absorbed by water droplets dewed thereon, thereby removing the pollutants from the exhaust gas, each said washing bar downwardly inclinedly extending from the side surface of said chemical ejection nozzle of the second chemical ejection means toward the inner surface of the side wall of the third neutralizing reservoir.

9. An apparatus for purifying polluted poisonous exhaust gas comprising:

a) first processing means for removing a portion of the pollutants from said exhaust gas and for causing the exhaust gas to be heat-exchanged with cooling water so as to permit the exhaust gas temperature to be reduced to a predetermined degree;

b) second processing means for neutralizing and washing the exhaust gas processed in said first processing means for removing the remaining pollutants from the exhaust gas, said second processing means connected to said first processing means by a plurality of lines;

c) said first processing means comprising:
i) at least one cyclone for removing floating dust from said polluted poisonous exhaust gas;
ii) heat exchanging means for gradually lowering the temperature of the exhaust gas;
iii) a heat exchange cooler providing a cooling water jet of a predetermined pressure for causing the temperature of the exhaust gas to rapidly fall simultaneously with extracting a predetermined portion of the pollutants from the exhaust gas;
iv) a gas-water separator for separating the moisture from the exhaust gas containing the pollutants emitted from said heat exchange cooler;
v) cooling tower for providing the cooling water;
vi) an auxiliary cooler for collecting cooling water from said heat exchanging means, said heat exchange cooler, and said gas-water separator, and returning to said cooling tower, said auxiliary cooler further supplying the cooling water to a water collection reservoir of said second processing means and auxiliarily cooling the cooling water outputted from said water collection reservoir;

vii) means for draining the pollutants extracted from the exhaust gas to a pollutant collection reservoir and discharging to a pollutant treating means;

d) said second processing means comprising:
  i) a plurality of neutralizing reservoirs for neutralizing the exhaust gas emitted from said first processing means;
  ii) a first gas-water separating reservoir for separating the exhaust gas from said cooling water;
  iii) means for washing the exhaust gas;
  iv) first chemical ejection means for mixing the exhaust gas in one of said neutralizing reservoirs;
  v) pollutant draining means for draining the pollutants, removed from the exhaust gas to a pollutant collection reservoir; and
  vi) second chemical ejection means for mixing the exhaust gas in another of said neutralizing reservoirs.

10. An apparatus for purifying polluted exhaust gas, comprising:
  a) first processing means for removing a portion of the pollutants from the exhaust gas;
  b) said first processing means including heat-exchange means for lowering the temperature of the exhaust gas to a predetermined level;
  c) second processing means operably connected to said first processing means for removing the remaining portion of the pollutants from the exhaust gas;
  d) said second processing means including means for neutralizing the pollutants remaining in the exhaust gas after treatment by said first processing means;
  e) said pollutant neutralizing means including a first neutralizing reservoir for mixing the exhaust gas with water for thereby dissolving a second portion of the pollutants in the water, said first neutralizing reservoir comprising upper and lower lateral partitions disposed in the first neutralizing reservoir providing a gas inlet chamber therebetween, a plurality of cooling water ejection nozzles between the lateral partitions, a plurality of diffusers below said ejection nozzles, a plurality of atomizing members disposed below said diffusers and an outlet for directing the firstly neutralized gas out of said first neutralizing reservoir;
  f) said pollutant neutralizing means including a second neutralizing reservoir for mixing the exhaust gas emitted from said first reservoir with a chemical neutralizing agent, said second neutralizing reservoir comprising a plurality of ejectors disposed along the side wall of the second neutralizing reservoir, a cooling water ejection nozzle vertically aligned with said ejectors, a lateral partition in the upper part of the second neutralizing reservoir having an outlet for upwardly passing the exhaust gas, and a gas dispersion means disposed above an inlet connected to the outlet of said first neutralizing reservoir for admitting the firstly neutralized gas; and
  g) means for collecting and discharging the pollutants removed from the exhaust gas.

11. The apparatus of claim 10, wherein:
  a) said first processing means includes at least one dust collecting means; and
  b) said dust collecting means removes about 5% of the pollutants from the exhaust gas.

12. The apparatus of claim 10, wherein:
  a) said heat-exchange means includes a heat-exchange cooler for lowering the temperature of the exhaust gas to about 60° C.

13. The apparatus of claim 11, wherein:
  a) said heat-exchange cooler includes means for removing the pollutants by dissolving in water; and
  b) said pollutant dissolving means removes about 30% of the pollutants from the exhaust gas.

14. The apparatus of claim 10, further including:
  a) means operably connected to said second reservoir for recycling the chemical neutralizing agents.

15. The apparatus of claim 10, wherein:
  a) said chemical neutralizing agent is selected from the group consisting of an acidic, an alkaline, and a neutral agent.

* * * * *